United States Patent
Göbel et al.

(10) Patent No.: US 7,220,059 B2
(45) Date of Patent: May 22, 2007

(54) DOUBLE-ROW ANGULAR-CONTACT ANTIFRICTION BEARING

(75) Inventors: Dieter Göbel, Thundorf (DE); Bernd Röhner, Hofheim (DE); Günter Herles, Dittelbrunn (DE); Stefan Scharting, Gochsheim (DE); Milos Grujic, Melbourne (AU)

(73) Assignee: FAG Kugelfischer AG (DE)

( * ) Notice: Subject to any disclaimer, the term of this patent is extended or adjusted under 35 U.S.C. 154(b) by 121 days.

(21) Appl. No.: 11/106,327

(22) Filed: Apr. 14, 2005

(65) Prior Publication Data
US 2005/0232528 A1    Oct. 20, 2005

(30) Foreign Application Priority Data
Apr. 14, 2004   (DE) ............... 10 2004 018 188

(51) Int. Cl.
*F16C 33/58* (2006.01)
(52) U.S. Cl. ............... 384/551; 384/571
(58) Field of Classification Search .......... 384/571, 384/551, 506, 504
See application file for complete search history.

(56) References Cited

U.S. PATENT DOCUMENTS

| | | | | |
|---|---|---|---|---|
| 1,908,474 A | * | 5/1933 | Dewees | 384/501 |
| 2,447,928 A | * | 8/1948 | Bergstrom | 384/571 |
| 5,492,419 A | * | 2/1996 | Miller et al. | 384/551 |
| 6,315,457 B1 | * | 11/2001 | Kapaan et al. | 384/544 |
| 6,786,645 B2 | * | 9/2004 | Joki et al. | 384/488 |
| 7,036,989 B2 | * | 5/2006 | Taki et al. | 384/475 |

FOREIGN PATENT DOCUMENTS

| | | |
|---|---|---|
| DE | 84 29 899 U1 | 10/1984 |
| DE | 36 21 381 A1 | 6/1986 |
| DE | 90 17 831 U1 | 5/1992 |

* cited by examiner

*Primary Examiner*—Thomas R. Hannon
(74) *Attorney, Agent, or Firm*—Ostrolenk, Faber, Gerb & Soffen, LLP

(57) ABSTRACT

A double-row angular-contact antifriction bearing including an outer bearing ring, and an inner bearing ring and rolling elements between the bearing rings in two rows next to one another on raceways of the bearing rings. A bearing cage for the rolling elements. The inner bearing ring is axially split and is of two individual rings which are connected and between which a distance ring defines axial prestress between the rolling elements of the both rows. The distance ring between the individual rings of the axially split inner ring is a connecting element of the individual rings.

13 Claims, 1 Drawing Sheet

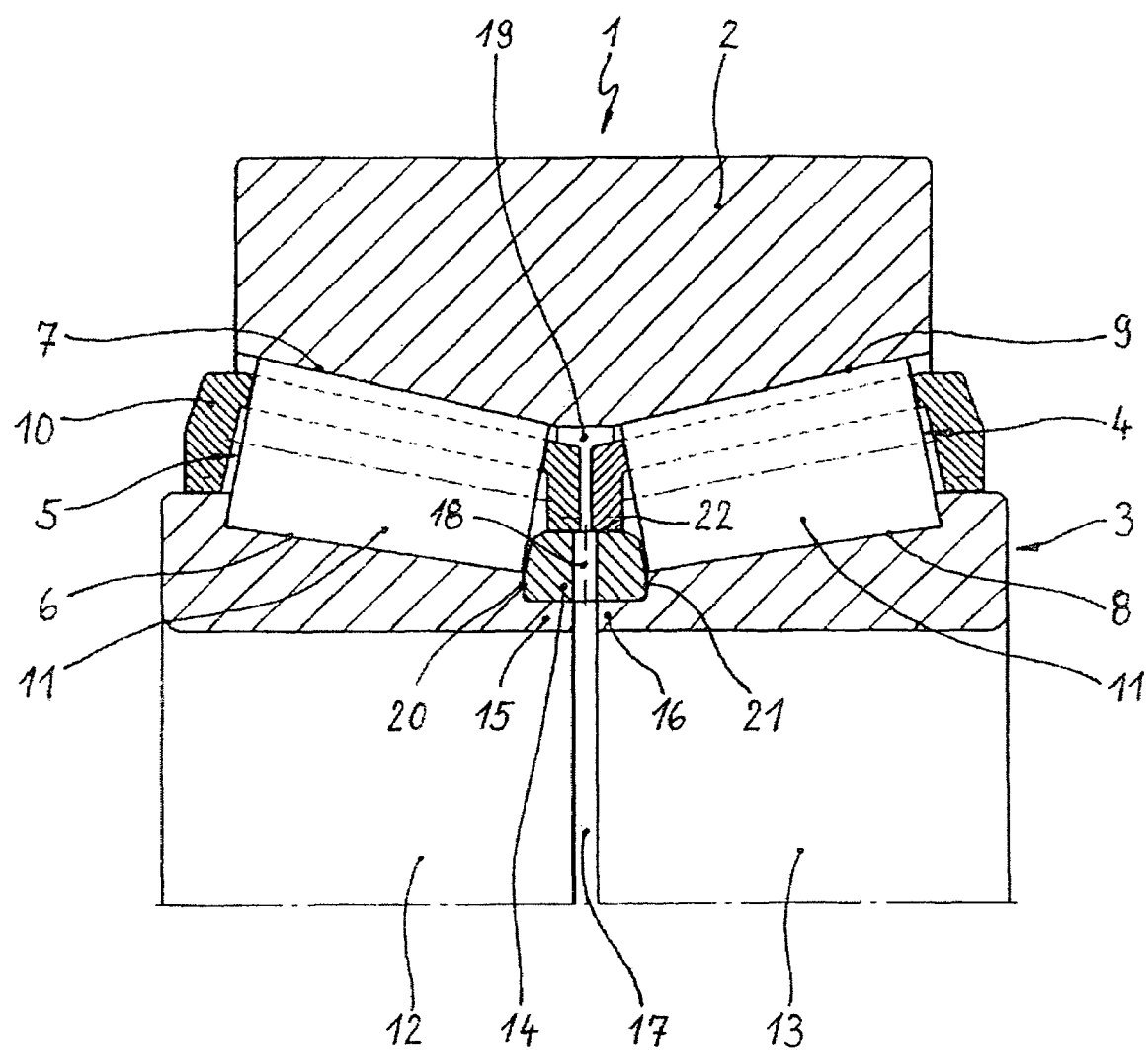

DOUBLE-ROW ANGULAR-CONTACT ANTIFRICTION BEARING

FIELD OF THE INVENTION

The invention relates to a double-row angular-contact antifriction bearing in X or O arrangement which can be advantageously realized on a double-row tapered roller bearing in O arrangement.

BACKGROUND OF THE INVENTION

DE 90 17 861 U1 discloses such an angular-contact antifriction bearing and establishes the generic type. This angular-contact antifriction bearing is designed as a double-row tapered roller bearing in O arrangement. It essentially comprises an outer bearing ring and an inner bearing ring and a number of tapered rollers which roll between the bearing rings in two rows next to one another on the raceways of the bearing rings and are kept apart at uniform distances by a respective bearing cage. In this case, the outer bearing ring is of one-piece design, whereas the inner bearing ring of the tapered roller bearing is axially split and comprised of two individual rings. With the fitting of the bearing in machines or the like, the individual rings are usually positioned relative to one another by an interference fit on a shaft in such a way that production-related tolerances during the production of the individual parts of the antifriction bearing are compensated for, and defined axial prestress is produced between the tapered rollers of both rows. This axial prestress enables the bearing to roll free of play to the greatest possible extent under load.

The measures for defining the degree of the axial prestressing of the individual rings of an axially split bearing ring relative to one another, which measures were known up to the time of the application of DE 90 17 861 U1 and are still customary today, were in this case either to grind down the end faces of the touching end faces of the individual rings in an appropriately dimensionally accurate manner or to grind down in a dimensionally accurate manner the end faces of a separate distance ring arranged between the individual rings and then to join together all the individual parts in an accurately fitting manner. However, since these measures only made it possible to compensate for the tolerances occurring during the production of the individual parts of the antifriction bearing and did not take into account the tolerance variations of the shaft to be equipped with the antifriction bearing, DE 90 17 861 U1 additionally proposed to arrange a distance ring, consisting of two ring segments, between the individual rings of the axially split bearing ring. In this case, one ring segment of this distance ring is determined in its width in such a way that it takes into account the tolerances during the production of the antifriction bearing, whereas the other ring segment is adapted in its width to the tolerance variations of the shaft.

In practice, however, it has been found that such compensation of tolerances or the achievement of defined axial prestress between the rolling elements by joining the individual rings of the axially split bearing ring to one another, both with and without an inserted distance ring and with a multi-piece distance ring by an interference fit on the shaft, involves considerable difficulties, since the high setting forces required for the interference fit not infrequently result in an elastic deformation of the individual rings of the axially split bearing ring up to their raceways, and the desired play between the rolling elements of the inner bearing ring is usually not reached due to this elastic deformation. As a result, the rolling elements are not prestressed in a defined manner but are adversely restrained against one another, so that jamming of the rolling elements on the ring flange of their raceway and subsequent increased wear of the bearing right up to failure of the bearing may occur. In this case, a basic cause of the usually imperfect prestressing of the bearing fitted on the shaft is the fact that, although the bearing manufacture can dimensionally produce all the individual parts of the bearing in such a way that the individual rings or the axially split bearing ring or the rolling elements of both rows in the fitted state of the bearing ought to theoretically have ideal axial prestress relative to one another, the rolling elements actually only rarely have such defined prestress, since the bearing is assembled by the user himself.

A conceivable improvement of this state would therefore be to already connect together the individual rings of the axially split bearing at the bearing manufacture by means of clamping rings of U-shaped cross section, as disclosed, for example, by DE 84 29 899 U1 or by DE 36 21 381 A1. However, such clamping rings, which are usually made of thin metal sheets or of plastic, are not suitable for producing or for maintaining defined axial prestress between the individual rings of the axially split bearing ring or between the rolling elements of both rows as they roll on their raceways.

OBJECT OF THE INVENTION

Starting from the explained disadvantages of the solutions of the known prior art, the object of the invention is therefore to provide a double-row angular-contact antifriction bearing in which the individual rings of the axially split bearing ring or the rolling elements rolling on their raceways have permanently acting, defined axial prestress relative to one another which is determined by the bearing manufacturer and no longer changes even during the fitting of the bearing by the user.

Other features and advantages of the present invention will become apparent from the following description of the invention which refers to the accompanying drawings.

DESCRIPTION OF THE INVENTION

According to the invention, this object is achieved in the case of a double-row angular-contact antifriction bearing by the angular-contact antifriction bearing being designed as a construction unit which is preassembled in a ready-to-fit manner and has defined axial prestress between the rolling elements and in which the distance ring between the individual rings of the axially split inner bearing ring is at the same time designed as the connecting element of the individual rings.

In an exemplary embodiment, the angular-contact antifriction bearing according to the invention is preferably designed as a double-row tapered roller bearing in O arrangement which has a one-piece outer bearing ring and an inner bearing ring axially split into two individual rings. In this case, the design of this tapered roller bearing as a construction unit, which is preassembled in a ready-to-fit manner and has defined axial prestress between the rolling elements, is effected in such a way that the individual rings of the inner bearing ring each have a step-shaped shoulder at the inner marginal region of their raceways. The inner rings are inseparably connected to one another by a frictional or integral connection with the distance ring, which can be put onto the shoulders in a centered manner. The desired defined axial prestress between the rolling elements is thus realized in a manner known per se by the distance ring ground to a corresponding width. However, during the assembly of the bearing, the distance ring is not only arranged between the individual rings of the axially split bearing ring but at the same time fixes them relative to one another by means of the preset defined axial prestress.

As a frictional connection between the individual rings of the inner bearing ring, it is proposed in an advantageous configuration of the tapered roller bearing designed according to the invention, to shrink the distance ring onto the individual rings, preferably by a controlled shrink-fit process, during the assembly of the tapered roller bearing. However, since the shrink-fit size of the distance ring can also be transferred here to the shoulders on the individual rings and this possibly results in a contraction of the bearing inside diameter due to elastic deformation of the shoulders, rework in the form of final calibration of the bearing inside diameter may possibly be necessary in this type of connection.

Therefore, in a further configuration of the tapered roller bearing designed according to the invention, the integral connection between the individual rings of the inner bearing ring constitutes an alternative to the frictional connection. This integral connection preferably is effected by applying a high-strength adhesive between the distance ring and the shoulders on the individual rings during the assembly of the tapered roller bearing. In this type of connection, the individual rings of the axially split bearing ring are not subjected to any thermal effects or elastic deformations whatsoever, so that the adhesive bonding of the distance ring on the shoulders of the individual rings is distinguished in particular by the omission of possible rework.

In addition, as a further feature of the tapered roller bearing designed according to the invention, the shoulders on the individual rings of the inner bearing ring have a total axial depth which is smaller than the width of the distance ring put onto the shoulders, so that the individual rings are thereby arranged relative to one another with a gap. This means that the distance ring does not rest on the shoulders of the individual rings of the inner bearing ring with its entire width but only with the marginal regions of its inner lateral surface. In this case, depending on the size of the tapered roller bearing, it is advantageous if these marginal regions each have a width which is about two fifths of the width of the inner lateral surface, so that the remaining gap between the individual rings of the inner bearing ring has a width of about one fifth of the width of the inner lateral surface.

In an advantageous configuration of the tapered roller bearing according to the invention, the gap formed between the individual rings of the inner bearing ring enables a suitable lubricant to be fed through the gap and via a plurality of additional radial bores in the distance ring to the region between the two rows of the rolling elements of the tapered roller bearing. In this case, the additional radial bores in the distance ring are incorporated in an expedient number in the profile of the distance ring in such a way as to be uniformly distributed over the circumference in the longitudinal center and preferably have a diameter which corresponds approximately to the width of the gap between the individual rings of the inner bearing ring.

Finally, as a further expedient development of the tapered roller bearing designed according to the invention, it is proposed that the distance ring between the individual rings of the inner bearing ring preferably be produced from a through-hardened antifriction-bearing steel and have an approximately rectangular profile cross section. In this case, the radial height of the rectangular profile or the thickness of the distance ring is preferably dimensioned in such a way that the side faces of the distance ring project beyond the raceways of the individual rings of the inner bearing ring, although it is also possible to design the distance ring in such a way that its encircling outer lateral surface directly adjoins the raceways of the individual rings.

The design of the distance ring with a thickness projecting above the raceways of the individual rings has the advantage that that part of the side faces of the distance ring which projects beyond the raceways can be designed with additional beveling adapted to the bearing pressure angle, so that the distance ring advantageously at the same time forms an inner annular flange for both rows of the rolling elements of the tapered roller bearing. At the same time, the encircling outer lateral surface of the distance ring can be used as a radial guide surface for the inner cage flanges of the two halves of the bearing cage of the tapered roller bearing, whereas the outer cage flanges of the bearing cage are guided on the outer annular flanges of the raceways of the inner bearing ring.

Compared with the angular-contact antifriction bearings disclosed by the prior art, the double-row angular-contact antifriction bearing designed according to the invention therefore has the advantage that, due to the distance ring designed at the same time as connecting element between the individual rings of the axially split bearing ring, it can be produced as a construction unit which is preassembled in a ready-to-fit manner and in which the individual rings or the rolling elements rolling on their raceways have permanently acting defined axial prestress relative to one another which is determined by the bearing manufacturer. Due to the design of the bearing as a preassembled construction unit, the defined prestress can therefore no longer change even when the bearing is fitted by the user, so that the adverse effects resulting from prestressing of the rolling elements are ruled out.

BRIEF DESCRIPTION OF THE DRAWINGS

A preferred embodiment of the antifriction bearing designed according to the invention is explained in more detail below with reference to the attached drawing. The single drawing here shows the enlarged illustration of one half of a cross section through a tapered roller bearing designed as an O-type bearing according to the invention with a one-piece outer bearing ring and an inner bearing ring axially split into two individual rings.

DETAILED DESCRIPTION OF THE DRAWINGS

An angular-contact antifriction bearing in the drawing is a tapered roller bearing 1 in an O arrangement and is intended as a cam roller for a sludge pump on oil drilling equipment or as a cutting roller for a tunnel-driving machine. This tapered roller bearing 1 essentially comprises an outer bearing ring 2 and an inner bearing ring 3 and also a number of rolling elements 11 which roll between the bearing rings 2, 3 in two rows next to one another on the raceways 6, 7, 8, 9 of the bearing rings 2, 3 and are kept at uniform distances apart by a bearing cage 10. In this case, the outer bearing ring 2 of this tapered roller bearing 1 is designed in one piece with an integrated overlapping ring, whereas the inner bearing ring 3 is designed in such a way as to be axially split into two individual rings 12, 13, between which a distance ring 14 defining the axial prestress between the rolling elements 11 of both rows 4, 5 is arranged.

Furthermore, it can be seen from the drawing that the tapered roller bearing 1, according to the invention, is designed as a construction unit which is preassembled in a ready-to-fit manner and has defined axial prestress between the rolling elements 11 and in which the distance ring 14 between the individual rings 12, 13 of the axially split inner bearing ring 3 is at the same time designed as the connecting element of the individual rings 12, 13.

For this purpose, the individual rings 12, 13 of the inner bearing ring 3 each have a step-shaped shoulder 15, 16 at the inner marginal region of their raceways 6, 8. It is possible for the distance ring 14 to be put onto the shoulders 15, 16 in a centered manner, and the individual rings 12, 13 are inseparably connected to one another in an integral manner. In this case, the integral connection between the individual rings 12, 13 of the inner bearing ring 3 is preferably effected by a high-strength adhesive consisting of two components, the activator component of which, for example, is applied to the inner lateral surface of the distance ring 14 and the adhesive component of which is applied to the shoulders 15, 16 on the individual rings 12, 13 during the assembly of the tapered roller bearing 1.

Furthermore, it can be seen from the drawing that the shoulders 15, 16 on the individual rings 12, 13 of the inner bearing ring 3 have a total axial depth which is smaller than the width of the distance ring 14 put onto the shoulders 15, 16, so that the individual rings 12, 13 are thereby arranged relative to one another with a gap 17. This gap 17 between the individual rings 12, 13 serves to enable lubricant to be fed through the gap 17, and via a number of additional radial bores 18 in the distance ring 14 to the region 19 between the two rows 4, 5 of the rolling elements 11 of the tapered roller bearing 1. It can be clearly seen that the additional radial bores 18 in the distance ring 14 are incorporated in an expedient number in the profile of the distance ring 14 in such a way as to be uniformly distributed over the circumference in the longitudinal center and preferably have a diameter which corresponds approximately to the width of the gap 17 between the individual rings 12, 13 of the inner bearing ring 3.

The drawing likewise clearly shows that the distance ring 14 is preferably produced from a through-hardened antifriction-bearing steel and has an approximately rectangular profile cross section. The side faces 20, 21 of the distance ring 14 project beyond the raceways 6, 8 of the individual rings 12, 13 of the inner bearing ring 3. In this case, by means of additional beveling, that part of the side faces 20, 21 of the distance ring 14 which projects radially beyond the raceways 6, 8 is at the same time designed as an inner annular flange for the rolling elements 11, whereas the encircling outer lateral surface 22 of the distance ring 14 at the same time forms a radial guide surface for the bearing cage 10 of the tapered roller bearing 1.

It merely remains to be mentioned that the described embodiment of the angular-contact antifriction bearing according to the invention is only exemplary and that the design according to the invention can of course also be appropriately realized on double-row tapered roller bearings in X arrangement or also on bearing units consisting of two or more bearings of any possible type of construction.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A double-row angular-contact antifriction bearing comprising
   an outer bearing ring with two outer raceways;
   an inner bearing ring with two inner raceways opposing the respective outer raceways;
   at least one of the bearing rings is of axially split design and is comprised of two individual rings which are connected to one another;
   a plurality of rolling elements which roll between the bearing rings and being arranged in two rows next to one another on the raceways of the bearing rings;
   a cage between the rings keeping the rolling element at uniform distances apart;
   a distance ring axially between the two individual rings of the at least one bearing ring, the distance ring defining an axial prestress between the rolling elements of the both rows, the distance ring projecting in a radial direction beyond at least one raceway of the split bearing ring to form an annular flange for the row of rolling elements on the at least one raceway,
   wherein the angular-contact antifriction bearing defines a construction unit which is preassembled in a ready-to-fit manner and has defined axial prestress between the rolling elements, and the distance ring between the individual rings of the axially split bearing ring is a connecting element of the individual rings.

2. A double-row roller bearing as claimed in claim 1, wherein the inner bearing ring is the axially ring split into two individual rings,
   the individual rings of the inner bearing ring each have a step-shaped shoulder at an inner marginal region of their respective raceways and also are inseparably connected to one another by a frictional or integral connection with the distance ring, which can be put onto the shoulders in a centered manner.

3. A double row roller bearing as claimed in claim 2, wherein the outer bearing ring is of one-piece.

4. The double-row roller bearing as claimed in claim 2, wherein the frictional connection between the individual rings of the inner bearing ring is effected by a controlled process of shrink fitting the distance ring onto the shoulders on the individual rings during assembly of the double-row roller bearing.

5. The double-row roller bearing as claimed in claim 2, wherein the integral connection between the individual rings of the inner bearing ring is effected by a high-strength adhesive between the distance ring and on the shoulders on the individual rings during assembly of the double-row roller bearing.

6. The double-row roller bearing as claimed in claim 2, wherein the shoulders on the individual rings of the inner bearing ring have a total axial depth which is smaller than the width of the distance ring on the shoulders, and the individual rings are thereby arranged relative to one another with a gap between the individual rings.

7. The double-row roller bearing as claimed in claim 6, wherein the gap is located and shaped such that lubricant can be fed through the gap between the individual rings; and a number of circumferentially distributed additional radial bores in the distance ring leading to a region between the two rows of the rolling elements of the double-row roller bearing.

8. The double-row roller bearing as claimed in claim 2, wherein the distance ring is of through-hardened antifriction-bearing steel and has an approximately rectangular profile cross section, the distance ring has side faces projecting beyond the raceways of the individual rings of the inner bearing ring.

9. The double-row roller bearing as claimed in claim 8, further comprising:
   beveling on a part of the side faces of the distance ring, the part projecting beyond the raceways and defining an inner annular flange for the rolling elements.

10. The double-row roller bearing as claimed in claim 8, further comprising:
    an encircling outer lateral surface of the distance ring defining a radial guide surface for the bearing cage of the double-row roller bearing.

11. A double-row angular-contact antifriction bearing comprising
    an outer bearing ring with two outer raceways;
    an inner bearing ring with two inner raceways opposing the respective outer raceways, the inner bearing ring being of axially split design and is comprised of two individual rings which are connected to one another, each individual ring having a step-shaped shoulder at an inner marginal region of their respective raceways and also are inseparably connected to one another by a frictional or integral connection with the distance ring, which can be put onto the shoulders in a centered manner;
    a plurality of rolling elements which roll between the bearing rings and being arranged in two rows next to one another on the raceways of the bearing rings;
    a cage between the rings keeping the rolling element at uniform distances apart;
    a distance ring axially between the two individual rings of the at least one bearing ring, the distance ring defining an axial prestress between the rolling elements of the both rows,
    wherein
    the angular-contact antifriction bearing defines a construction unit which is preassembled in a ready-to-fit manner and has defined axial prestress between the rolling elements, and the distance ring between the individual rings of the axially split bearing ring is a connecting element of the individual rings, and
    the shoulders of the individual rings of the inner bearing ring have a total axial depth which is smaller than the width of the distance ring on the shoulders, and the individual rings are thereby arranged relative to one another with a gap between the individual rings;
    the gap is located and shaped such that lubricant can be fed through the gap between the individual rings; and
    a number of circumferentially distributed additional radial bores in the distance ring leading to a region between the two rows of the rolling elements of the double-row roller bearing.

12. A double-row angular-contact antifriction bearing comprising
    an outer bearing ring with two outer raceways;
    an inner bearing ring with two inner raceways opposing the respective outer raceways, the inner bearing ring being of axially split design and is comprised of two individual rings which are connected to one another, each individual ring having a step-shaped shoulder at an inner marginal region of their respective raceways and also are inseparably connected to one another by a frictional or integral connection with the distance ring, which can be put onto the shoulders in a centered manner;
    a plurality of rolling elements which roll between the bearing rings and being arranged in two rows next to one another on the raceways of the bearing rings;
    a cage between the rings keeping the rolling element at uniform distances apart;
    a distance axially between the two individual rings of the at least one bearing ring, the distance ring defining an axial prestress between the rolling elements of the both rows,
    wherein the angular-contact antifriction bearing defines a construction unit which is preassembled in a ready-to-fit manner and has defined axial prestress between the rolling elements, and the distance ring between the individual rings of the axially split bearing ring is a connecting element of the individual rings,
    the distance ring is of through-hardened antifriction-bearing steel and has an approximately rectangular profile cross-section, the distance ring has side faces projecting beyond the raceways of the individual rings of the inner bearing ring.

13. The double-row roller bearing as claimed in claim 12, further comprising:
    beveling on a part of the side faces of the distance ring, the part projecting beyond the raceways and defining an inner annular flange for the rolling elements; and
    an encircling outer lateral surface of the distance ring defining a radial guide surface for the bearing cage of the double-row roller bearing.

* * * * *